(12) United States Patent
Huang (10) Patent No.: US 7,402,235 B2
(45) Date of Patent: Jul. 22, 2008

(54) VISCOSITY IMPROVER COMPOSITIONS PROVIDING IMPROVED LOW TEMPERATURE CHARACTERISTICS TO LUBRICATING OILS

(75) Inventor: Chor Huang, Avon Lake, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 425 days.

(21) Appl. No.: 10/332,526

(22) PCT Filed: Jul. 30, 2001

(86) PCT No.: PCT/US01/23830

§ 371 (c)(1), (2), (4) Date: Jan. 8, 2003

(87) PCT Pub. No.: WO02/10276

PCT Pub. Date: Feb. 7, 2002

(65) Prior Publication Data

US 2004/0038850 A1    Feb. 26, 2004

Related U.S. Application Data

(60) Provisional application No. 60/221,937, filed on Jul. 31, 2000.

(51) Int. Cl.
*C08L 23/02* (2006.01)
*C08L 23/04* (2006.01)
*C08L 23/08* (2006.01)
*C10M 157/00* (2006.01)

(52) U.S. Cl. .................... 208/18; 510/188; 510/475; 508/591; 526/348; 585/12; 585/18

(58) Field of Classification Search .............. 510/188, 510/475; 508/591; 526/348; 585/12, 18; 208/18

See application file for complete search history.

(56) References Cited

U.S. PATENT DOCUMENTS 3,389,087 A    6/1968    Kresge et al. ................. 252/59

(Continued)

FOREIGN PATENT DOCUMENTS

EP    637 611    2/1995

(Continued)

OTHER PUBLICATIONS

PCT International Application WO 96/17041, Jun. 6, 1996.

*Primary Examiner*—Brian P Mruk
(74) *Attorney, Agent, or Firm*—David M. Shold; Christopher D. Hilker (57) ABSTRACT

A mixture comprising A) a copolymer comprising from about 70 to about 79% by weight of units derived from ethylene, and having (a) $\overline{M}_w$ measured by gel permeation chromatography employing polystyrene standard ranging from about 50,000 up to less than 130,000 and/or (f) SSI≦18; (b) density (D) ranging from about 845 to about 895 kg/m³; (c) $\overline{M}_w/\overline{M}_n$ less than 3; (d) melting point ($T_m$) measured by differential scanning calorimeter ranging from about 15° C. to about 60° C.; and (e) degree of crystallinity≧15%, and B) an amorphous polymer having $\overline{M}_w$ ranging from about 130,000 to about 1,000,000 having degree of crystallinity≦5%. In one embodiment the density and the melting point of the copolymer A) fulfill the expression $T_m \leq 1.247 D - 1037$. In another embodiment, the percentage content (E: % by weight) of repeating units derived from ethylene and melting point ($T_m$: ° C.) of the copolymer A) fulfill the expression $3.44E - 206 \geq T_m$. Also, additive concentrates and lubricating compositions comprising the components making up the mixture.

23 Claims, 1 Drawing Sheet

U.S. PATENT DOCUMENTS

| | | |
|---|---|---|
| 3,522,180 A | 7/1970 | Sweeney et al. ............... 252/59 |
| 3,551,336 A | 12/1970 | Jacobson et al. .............. 252/59 |
| 3,691,078 A | 9/1972 | Johnston et al. ............... 252/59 |
| 3,697,429 A | 10/1972 | Engel et al. ................... 252/59 |
| 4,507,515 A | 3/1985 | Johnston et al. ............... 585/12 |
| 4,540,753 A | 9/1985 | Cozewith et al. .............. 526/88 |
| 4,804,794 A | 2/1989 | Ver Strate et al. ............. 585/12 |
| 4,874,820 A | 10/1989 | Cozewith et al. ............. 525/240 |
| 4,959,436 A | 9/1990 | Cozewith et al. ............. 526/348 |
| 5,382,630 A | 1/1995 | Stehling et al. ............. 525/240 |
| 5,382,631 A | 1/1995 | Stehling et al. ............. 525/240 |
| 5,391,617 A | 2/1995 | Olivier et al. ................ 525/72 |
| 5,451,630 A | 9/1995 | Olivier et al. ................ 524/528 |
| 5,451,636 A | 9/1995 | Olivier et al. ................ 525/72 |
| 6,525,007 B2 * | 2/2003 | Okada et al. ................ 508/591 |
| 7,053,153 B2 | 5/2006 | Schauder |
| 2002/0055445 A1 | 5/2002 | Okada et al. |
| 2004/0038850 A1 * | 2/2004 | Huang ........................ 510/475 |

FOREIGN PATENT DOCUMENTS

| | | | |
|---|---|---|---|
| EP | 638 611 | | 2/1995 |
| EP | 637611 | * | 2/1995 |
| EP | 1 178 102 | | 2/2002 |
| JP | WO 00/34420 | * | 6/2000 |

* cited by examiner

VISCOSITY IMPROVER COMPOSITIONS PROVIDING IMPROVED LOW TEMPERATURE CHARACTERISTICS TO LUBRICATING OILS

This application claims benefit of Provisional Application No. 60/221,937, filed Jul. 31, 2000.

FIELD OF THE INVENTION

This invention relates to polymeric compositions. More particularly, the invention relates to mixtures of relatively low molecular weight ethylene copolymers having certain characteristics and relatively high molecular weight amorphous polymers. These polymers are useful as viscosity improvers for lubricating oils.

BACKGROUND OFF THE INVENTION

The viscosity of oils of lubricating viscosity is generally dependent upon temperature. As the temperature of the oil is increased, the viscosity usually decreases, and as the temperature is reduced, the viscosity usually increases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved since the oil maintains a more consistent viscosity over a wider range of temperatures.

It is desirable that the viscosity improver not adversely affect the low-temperature viscosity of the lubricant containing same. Frequently, while many viscosity improvers enhance the high temperature viscosity characteristics of lubricating oil, the low temperature properties of the treated lubricant become worse.

Viscosity improvers are usually polymeric materials and are often referred to as viscosity index improvers and sometimes as viscosity modifiers.

Many ethylene derived polymers, especially ethylene-propylene copolymers are known and are used as viscosity improvers for lubricating oils compositions. Ethylene-propylene copolymers with high ethylene levels (e.g., 70-78 weight %) when used as viscosity modifiers in lubricants impart outstanding low temperature properties as measured by Cold Crank Simulator (CCS) ASTM Procedure D–5293 and Mini-Rotary Viscometer (MRV-TP1) ASTM Procedure D–4684. However, it has also been observed that formulations containing these polymers tend to experience gelation in cold temperature storage, filter plugging in cold temperature engine startup and the "Weissenberg effect during CCS measurement where the lubricant climbs up the rotating shaft of the test apparatus, leading to questionable CCS values. These effects are further exacerbated when the polymers are used with base oils containing synthetic stocks such as polyalpha-olefin stocks and synthetic ester stocks.

Additives that provide viscosity improving properties are known in the art. Such products are described in numerous publications including Dieter Klamann, "Lubricants and Related Products", Verlag Chemie Gmbh (1984), pp 185-193; C. V. Smalheer and R. K. Smith "Lubricant Additives", Lezius-Hiles Co. (1967); M. W. Ranney, "Lubricant Additives", Noyes Data Corp. (1973), pp 92-145, M. W. Ranney, "Lubricant Additives, Recent Developments", Noyes Data Corp. (1978), pp 139-164; and M. W. Ranney, "Synthetic Oils and Additives for Lubricants", Noyes Data Corp. (1980), pp 96-166.

U.S. Pat. No. 3,389,087 discloses amorphous-crystalline polymers comprised of 2-98 weight % ethylene and 2-98 weight % $C_{3-18}$ alpha olefins having molecular weight ranging from 20,000 to 250,000, a degree of head-to-head linkages ranging between 20% and 60% and a degree of crystallinity up to 25%. Also described are oil compositions containing the polymer.

U.S. Pat. No. 3,551,336 describes polymers comprised of ethylene (60-80 mole %) and $C_{3-18}$ alpha olefins having viscosity average molecular weight ranging from 10,000 to 200,000, $\overline{M}_w/\overline{M}_n$ less than 4 and a degree of crystallinity less than 25% and containing no more than 1.3% by weight of a polymer fraction which is insoluble in n-decane at 45° C. Also described are oil compositions containing the polymer.

U.S. Pat. No. 3,522,180 describes amorphous ethylene-propylene copolymers containing 20-70 mole % propylene and $\overline{M}_n$ of 10,000 to 40,000 and $\overline{M}_w/\overline{M}_n$ less than 5 which are said to be useful as viscosity index improvers for lubricating oil.

U.S. Pat. No. 3,691,078 relates to lubricating oil compositions comprising a neutral, non-volatile mineral oil, a pour point depressant and a viscosity improver consisting of an oil-soluble, substantially linear hydrocarbon polymer containing 25-55 weight % polymerized ethylene units and 75-45 weight % polymerized comonomer units. It is stated that the polymers do not adversely affect the pour point depressant.

U.S. Pat. No. 4,540,753 discloses a copolymer of at least 10 weight % up to 90 weight % ethylene and at least one other alpha-olefin monomer which copolymer is intramolecularly heterogeneous and intermolecularly homogeneous, has $\overline{M}_w$ from 2,000 up to 12,000,000 and $\overline{M}_w/\overline{M}_n$ less than 2 and/or $\overline{M}_z/\overline{M}_w$ less than 1.8. The polymers are described as being useful as viscosity improver for lubricating oils.

U.S. Pat. No. 4,804,794 discloses copolymers of alpha-olefins comprised of intramolecularly heterogeneous and intermolecularly homogeneous copolymer chains. At least one segment of the copolymer, constituting at least 10% of the copolymer's chain, is a crystallizable segment wherein the ethylene content is at least 55 weight % and the low crystallinity segment contains no more that 53 weight % ethylene.

U.S. Pat. No. 4,959,436 is directed to copolymers of ethylene and at least one other alpha olefin monomer which copolymer is intramolecularly heterogeneous and intermolecularly homogeneous, wherein at least two portions of an individual intermolecularly heterogeneous chain, each portion comprising at least 5 weight % of the chain, differ in composition from one another by at least 5 weight % ethylene and has $\overline{M}_w/\overline{M}_n$ less than 2 and/or $\overline{M}_z/\overline{M}_w$ less than 1.8

U.S. Pat. No. 3,697,429 discloses a lubricating oil composition comprising a lubricating oil and contained therein an amount sufficient to modify the viscosity index of said oil, a viscosity index improving amount of an oil-soluble polymer composition comprising a first copolymer of ethylene and a $C_{3-18}$ alpha-olefin having an ethylene content of 50-95 mole % and a second copolymer of ethylene and a $C_{3-18}$ alpha-olefin having an ethylene content of 5-80 mole %, the ethylene content of the first copolymer being at least 5 mole % more than the ethylene content of the second copolymer.

U.S. Pat. No. 4,507,515 discloses a lubricating oil composition comprising an ethylene alpha-olefin copolymer having a major and a minor portion, the major portion having $\overline{M}_w$ of 10,000 to 500,000, a Mooney viscosity at 100° C. of 0.5 to 500, 10-60 weight % ethylene and ethylene sequence distribution such that the mean number of ethylene units in sequence equal to or greater than 3 consecutive ethylene units is a value of 3 to 4.5 and the fraction of ethylene sequences containing three or more ethylene units is 0.01 to 0.3 based on the total number of ethylene sequences in the major portion and the minor portion having $\overline{M}_w$ of 1,000 to 2,000,000, an ethylene sequence of 55 to 95% ethylene, an ethylene sequence distribution such that the mean number of ethylenes in sequences greater than or equal to three consecutive ethylene units is 4 to 20 and the fraction of ethylene sequences containing three or more consecutive ethylene units is 0.35 to 0.95, based on the total number of ethylene sequences in the minor portion.

U.S. Pat. Nos. 5,391,617; 5,451,636 and 5,451,630 describe a sheared blend and a process for producing the sheared blend and lubricating oils containing the sheared blend in which high ethylene content (65-85 mole %) and low ethylene content (35-65 mole %) ethylene-propylene copolymers, each having $\overline{M}_n$ 40,000 to 250,000 and $\overline{M}_w/\overline{M}_n$ 2-7 are subjected to simultaneous blending and shearing.

U.S. Pat. Nos. 5,382,630 and 5,382,631 disclose linear interpolymer blends made from components having $\overline{M}_w/\overline{M}_n \leq 3$ and composition distribution>50%. The blend components can all have the same molecular weight but different comonomer contents, the same comonomer content but different molecular weights or comonomer contents which increase with molecular weight.

U.S. Pat. No. 4,874,820 discloses ethylene alpha-olefin copolymer compositions comprising a first copolymer having $\overline{M}_w/\overline{M}_n$ less than 2 and/or $\overline{M}_z/\overline{M}_w$ less than 1.8 and a second copolymer having $\overline{M}_w/\overline{M}_n$ greater than or equal to 2.

Each of these publications is hereby expressly incorporated herein by reference.

When the polymers disclosed in these patents are used as viscosity modifiers for lubricating oils, frequently the problems of gelation, filter plugging and Weissenberg effect are encountered, making them unsuitable for use in lubricant applications, especially where the lubricant will encounter low temperatures.

An important object of this invention is to provide compositions that reduce the extent of loss of viscosity at high temperatures while not adversely increasing the low temperature viscosity of lubricating oil compositions.

Another object is to provide novel additive concentrates.

A more specific object is to provide additives directed to improving the viscosity properties of a lubricating composition.

Yet another object is to provide lubricants having improved viscosity properties.

Another object is to provide additive concentrates for lubricants.

Other objects will in part be obvious in view of this disclosure and will in part appear hereinafter.

SUMMARY OF THE INVENTION

The present invention involves the use of lower molecular weight higher ethylene content crystalline ethylene copolymers having $\overline{M}_w$ less than about 130,000 to reduce and eliminate the aforementioned problems. It has been surprisingly discovered that blending these lower molecular weight crystalline polymers with higher molecular weight amorphous polymers provides even greater improvement.

The present invention is directed to a mixture comprising A) a copolymer comprising from about 60 to about 85% by weight of (E) units derived from ethylene, and having (a) $\overline{M}_w$ measured by gel permeation chromatography employing polystyrene standard ranging from about 50,000 up to less than 130,000 and/or (f) shear stability index (SSI)$\leq$18, as determined employing ASTM Procedures D-6278 and D-6022; (b) density (D) ranging from about 845 to about 895 kg/m$^3$; (c) $\overline{M}_w/\overline{M}_n$ less than 3; (d) melting point ($T_m$) measured by differential scanning calorimeter ranging from about 15° C. to about 60° C.; and (e) degree of crystallinity$\geq$15% and B) an amorphous polymer having $\overline{M}_w$ ranging from about 130,000 to about 1.000,000, having degree of crystallinity$\leq$5%. In one embodiment, the density and the melting point of copolymer A) fulfill the expression $T_m \leq 1.247D - 1037$. In another embodiment, the percentage content (E: % by weight) of repeating units derived from ethylene and melting point ($T_m$: ° C.) of the copolymer A) fulfill the expression $3.44E - 206 \geq T_m$ The invention is also directed to processes for preparing the mixture, to additive concentrates and to lubricating oil compositions.

The overall effect of blending a low molecular weight, high ethylene content, crystalline copolymer with a higher molecular weight, amorphous polymer is to produce a polymeric viscosity improver composition for lubricating oils which has good thickening efficiency at high temperatures, good shear stability and good low temperature properties without the aforementioned problems of gelation, filter plugging and Weissenberg effect. The result is a viscosity improver composition with the outstanding low temperature properties of the aforementioned ethylenepropylene copolymers without the problems associated with them.

DETAILED DESCRIPTION OF THE INVENTION

As used herein, the term "hydrocarbon" means a group which is purely hydrocarbon, that is, a compound of hydrogen and carbon containing no hetero atoms. The terms "hydrocarbyl" and "hydrocarbon based" means that the group being described has predominantly hydrocarbon character within the context of this invention. Hydrocarbyl and hydrocarbon based groups include groups that are purely hydrocarbon in nature, that is, they contain only carbon and hydrogen. They may also include groups containing non-hydrocarbon substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms. Thus, the terms "hydrocarbyl" and "hydrocarbon based" are broader than the term "hydrocarbon" since all hydrocarbon groups are also hydrocarbyl or "hydrocarbon based" groups while hydrocarbyl groups or hydrocarbon based groups containing hetero atoms are not hydrocarbon groups as defined herein.

In general, no more than about three non-hydrocarbon substituents or hetero atoms, and preferably no more than one, will be present for every 10 carbon atoms in hydrocarbyl or hydrocarbon based groups. Most preferably, these groups are purely hydrocarbon in nature, that is they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat.

No. 4,320,019 which is expressly incorporated herein by reference for relevant teachings in this regard.

It must be noted that as used in this specification and appended claims, the singular forms also include the plural unless the context clearly dictates otherwise. Thus the singular forms "a", "an", and "the" include the plural; for example "an olefin" includes mixtures of olefins of the same type. As another example the singular form "olefin" is intended to include both singular and plural unless the context clearly indicates otherwise.

The Lower Molecular Weight Ethylene Copolymer

The mixtures and compositions of this invention comprise at least two polymers as set forth hereinabove and in greater detail hereinbelow. The first polymer is A) a copolymer comprising from about 60 to about 85% by weight of units derived from ethylene, and having (a) $\overline{M}_w$ measured by gel permeation chromatography employing polystyrene standard ranging from about 50,000 up to less than 130,000 and/or (f) SSI≧18 as determined employing ASTM Procedures D–6278 and D–6022; (b) density (D) ranging from about 845 to about 895 kg/m³, preferably from about 857 to about 882 kg/m³; (c) $\overline{M}_w/\overline{M}_n$ less than 3; (d) melting point ($T_m$) measured by differential scanning calorimeter ranging from about 15° C. to about 60° C.; and (e) degree of crystallinity≧15%. As noted hereinabove, in one embodiment the density and the melting point fulfill the expression $T_m$≧1.247 D–1037 and in another embodiment the percentage content (E: % by weight) of repeating units derived from ethylene and melting point ($T_m$: °C.) of the copolymer A) fulfill the expression 3.44E–206≧$T_m$.

The copolymer has a degree of crystallinity of at least 15%, preferably from about 20% to about 30%. Differential thermal analysis and X-ray diffraction techniques are useful for determining the degree of crystallinity of the polymers used in this invention. These procedures are well known to those skilled in the art and are described in, for example, U.S. Pat. No. 3,389,087. In the procedure described in this patent, differential thermal analysis indicated the presence of crystallinity and X-ray diffraction patterns indicated the degree of crystallinity. A discussion of crystallinity of polymers is given in various sections of Billmeyer, Jr., Textbook of Polymer Science, 3rd Ed., Wiley-Interscience, at, for example pp. 232-233, 240, 252, 286-289, 342-344, 399 and 420. A specific discussion of degree of crystallinity and methods for determining same appears at pp. 286-289.

Copolymer A) comprises from about 60 to about 85% by weight of units derived from ethylene, preferably from about 70 to about 79% by weight and more preferably, from about 74 to about 76% by weight. The comonomer may be any monomer that is copolymerizable with ethylene but preferably, the comonomer comprises an olefin, particularly an olefin containing from about 3 to about 18 carbon atoms, and more preferably, alpha olefins. Propylene is an especially preferred comonomer. In another embodiment, the first copolymer further comprises units derived from polyenes, preferably dienes, most preferably non-conjugated dienes. Typically, polyene containing polymers comprise from about 0.5 to about 10 parts by weight of units derived from polyenes.

Ethylene content of the copolymer is measured using $^{13}C$ nuclear magnetic resonance (NMR).

The weight average molecular weight ($\overline{M}_w$) of the copolymer (A) is measured by gel permeation chromatography (GPC), (also known as size-exclusion chromatography), employing polystyrene standard, ranges from about 50,000 up to less than 130,000, more often from about 70,000 to about 120,000 or to about 110,000 and preferably from about 80,000 to about 90,000.

The first copolymer has $\overline{M}_w/\overline{M}_n$, which is an index of molecular weight distribution, less than 3, preferably 1.5 to about 2.2, wherein $\overline{M}_n$ is the number average molecular weight of the copolymer, also measured by GPC.

The GPC technique employs standard materials against which the samples are compared. For best results, standards that are chemically similar to those of the sample are used. For example, for polystyrene polymers, a polystyrene standard, preferably of similar molecular weight, is employed. When standards are dissimilar to the sample, generally relative molecular weights of related polymers can be determined. For example, using a polystyrene standard, relative, but not absolute, molecular weights of a series of polymethacrylates may be determined. These and other procedures are described in numerous publications including:

P. J. Flory, "Principles of Polymer Chemistry", Cornell University Press (1953), Chapter VII, pp 266-316, "Macromolecules, an Introduction to Polymer Science", F. A. Bovey and F. H. Winslow, Editors, Academic Press (1979), pp 296-312 and W. W. Yau, J. J. Kirkland and D. D. Bly, "Modern Size Exclusion Liquid Chromatography", John Wiley and Sons, New York, 1979.

The copolymer has density ranging from about 857 to about 882 kg/m³. ASTM Procedure D–1505 is frequently used to measure polymer density.

The melting point of the copolymer ranges from about 15° C. to about 60° C., preferably 25° C. to about 50° C. and more preferably 25-45° C. Melting point of the copolymer is determined employing differential scanning calorimeter. The melting point is the temperature in the maximum peak position in the endothermic curve. The melting point is determined from the second run endothermic curve obtained by charging a sample into an aluminum pan, heating it to 200° C. at 10° C./minute, holding it at 200° C. for 5 minutes and thereafter cooling it to –150° C. at 20° C./minute and then heating it at 10° C./minute to obtain a second run endothermic curve. From the obtained curve, the melting point is determined.

In one embodiment, the copolymer satisfies the relationship of formula (I) between the density (D: kg/m³) and melting point ($T_m$: °C.) measured by differential scanning calorimeter:

$$T_m \leq 1.247D1037 \qquad (I).$$

In another embodiment, the copolymer satisfies the relationship of formula (II) between a percentage content (E: % by weight) of repeating units derived from ethylene and melting point ($T_m$: °C.):

$$3.44E-206 \geq T_m \qquad (II)$$

These copolymers A) are designed to minimize interaction in lubricating oil compositions between the copolymer A) and pour point depressants. A brief discussion of pour point depressants is presented hereinafter.

The copolymer A) is prepared employing olefinic polymerization catalyst, including catalysts consisting of a transition metal compound such as vanadium, zirconium, titanium and the like, and organic aluminum compound (an organic aluminumoxy compound) and/or an ionized ionic compound. Preferred among these are vanadium type catalysts consisting of a solid vanadium compound and an organic aluminum compound and metallocene catalyst consisting of a metallocene compound of a transition metal selected from Group 4 of the Periodic Table of Elements, an organic aluminumoxy compound and an ionized ionic compound. Soluble vanadium compounds are represented by the general formulae $$VO(OR)_aX_b \text{ or } V(OR)_cX_d$$

wherein R is a hydrocarbon group, X is a halogen atom, and a, b, c and d are such that each satisfies $0 \leq a \leq 3$, $0 \leq b \leq 3$, $2 \leq a+b \leq 3$, $0 \leq c \leq 4$, $0 \leq d \leq 4$, $3 \leq c+d \leq 4$.

Organic aluminum compounds which constitute the vanadium type catalysts are represented by the general formula $$R^1{}_nAlX_{3-n}$$

wherein $R^1$ is a hydrocarbon group containing 1-15 carbon atoms, preferably 1-4 carbon atoms, X is H or halogen and n ranges from 1 to 3.

$R^1$ groups include, for example, alkyl, cycloalkyl, and aryl.

The organic aluminum compounds include, specifically, trialkyl aluminums, alkenyl aluminums, trialkenyl aluminums, diallcyl aluminum halides, alkyl aluminum sesquihalides, alkyl aluminum halides, dialkyl aluminum hydrides and alkyl aluminum dihydrides.

Illustrative metallocene type catalysts include metallocene compounds of transition metals selected from Group 4 of the Periodic Table of Elements and specifically represented by the general formula $$ML_x$$

wherein M is a transition metal selected from Group 4 of the Periodic Table of Elements, preferably zirconium, titanium and hafnium and x is a valence of the transition metal, L is a ligand which coordinates with the transition metal, wherein at least one L is a ligand with a cyclopentadienyl backbone, which may have a substituent. Examples of ligands include, alkyl- or cycloalkyl-substituted cyclopentadienyl groups, an indenyl group, a 4,5,6,7-tetrahydroindenyl group, a fluorenyl group and the like. These groups may be substituted with halogen, trialkylsilyl and the like.

Especially preferred are alkyl-substituted cyclopentadienyl groups.

When the metallocene compound has two or more groups with a cyclopentadienyl backbone as the ligand L, two of these groups with a cyclopentadienyl backbone may be bonded to each other via an alkylene group, a substituted alkylene group or a silylene group or a substituted silylene group.

The L ligands other than those with a cyclopentadienyl backbone include hydrocarbon groups of 1-12 carbon atoms, including alkyl, cycloalkyl, aryl, aralkyl an the like; alkoxy groups; aryloxy groups; sulfonic-acid containing groups; halogen and H.

A compound represented by the general formula $$L^1M^1X_2$$

wherein M is a metal selected from Group 4 of the Periodic Table of Elements or lanthanides, $L^1$ is a derivative of a non-localized π bonding group which imparts a constraint geometric formation the metal $M^1$ active site, each X is, independently, H, halogen, hydrocarbon containing less than 20 carbon atoms, silicon, germanium, silyl or germanyl. Among compounds of this type, preferred are those represented by the general formula:

Wherein $M^1$ is titanium, hafnium or zirconium and X is defined hereinabove. $C_p$ is a substituted cyclopentadienyl group which is π bonded to $M^1$ and has a substituent Z, wherein Z is sulfur, oxygen, boron or an element of Group 14 of the Periodic Table of Elements, Y is a ligand containing phosphorus, nitrogen or sulfur and Z and Y may form a fused ring. The metallocene compounds may be used individually or in combination.

A most preferred metallocene compound of formula $ML_x$ is a zirconocene compound with a ligand containing at least two cyclopentadienyl backbones in which the center metallic atom is zirconium.

It is preferred that the center metallic atom be titanium in metallocene compounds represented by the formulae $L_1M^1X_2$ and Especially preferred are compounds represented by in which the center metallic atom is titanium.

Organic aluminumoxy compounds which constitute metallocene-type catalyst are aluminooxanes and benzene-insoluble organic aluminumoxy compounds.

Ionized ionic compounds which constitute metallocene-type catalysts are illustrated by Lewis acids, ionic compounds such as trialkyl substituted ammonium salts, N,N-dialkyl anilinium salts, dialkyl ammonium salts, triarylphosphonium salts and the like.

Organic aluminum compounds and organic aluminumoxy compounds and/or ionized ionic compounds may be used together.

The copolymer A) is prepared by copolymerizing ethylene and the other monomers, usually propylene in the presence of the vanadium-type catalyst as described above. When a vanadium-type catalyst is employed the concentration of a soluble vanadium compound in the polymerization system is usually 0.01 to 5 millimole/liter, preferably 0.05 to 3 millimole/liter of polymerization volume. Desirably, a soluble vanadium compound is fed in a ten-fold or less, preferably 1-5 fold concentration of the concentration of the soluble vanadium compound present in the polymerization system. The organic aluminum compound is fed in such an amount that the molar ratio Al/V is 2 or more, preferably 3-20.

When a metallocene type catalyst is employed, the concentration thereof in the polymerization system is usually 0.00005 to 0.1 millimole/liter. The organic aluminumoxy compound is fed in such an amount that the Al/transition metal molar ratio in the metallocene compound in the polymerization system is about 1 to 10,000.

The ionized ionic compound is fed in such an amount that the molar ratio of ionized compound to the metallocene compound is from 0.5 to 30.

The organic aluminum compound is used, it is usually used in amounts ranging from 0-5 millimole/liter of polymerization volume.

Polymerization in the presence of the vanadium-type catalyst is usually conducted at −50° C. to 100° C. and the pressure is greater than atmospheric, up to about 50 kg/cm$^3$.

Polymerization in the presence of the metallocene-type catalyst is usually at −20° C. to 150° C. and the pressure is greater than atmospheric, up to about 80 kg/cm$^3$.

Reaction times depend upon catalyst concentration and polymerization temperature, but typically range from about 5 minutes up to 5 hours.

Dispersant-viscosity improvers (DVI), that is, polymers having polar group containing monomers copolymerized with the monomers making up the ethylene copolymer or grafted onto the ethylene copolymer backbone are also contemplated.

The Amorphous Polymer

As noted hereinabove the mixtures and compositions of this invention comprise at least two polymers. The first polymer, copolymer A) has been described in detail hereinabove. One particularly critical characteristic of copolymer A) is the degree of crystallinity. The second polymer, polymer B) is an amorphous polymer having degree of crystallinity≦5%. This polymer has $\overline{M}_w$ ranging from about 130,000 to about 1,000,000, often to about 500,000, preferably from about 200,000 to about 400,000.

The amorphous polymer B) comprises at least one member of the group consisting of copolymers of vinyl group substituted aromatic-polyene copolymers, for example, styrene-conjugated diene copolymers which polymers may be hydrogenated; polymers of olefins, especially alpha-olefins, having from 2 to about 28 carbon atoms, for example polybutenes, including polyisobutylenes, and ethylene-propylene and ethylene-propylene-diene copolymers (45-55% by weight ethylene); polyacrylates, including polymethacrylates; polymeric carboxylic ester, for example, esters of styrene-maleic anhydride copolymers, including those which have been partially or completely neutralized with an amine, and aliphatic olefin-alpha, beta-unsaturated acylating agent copolymers. Each of these amorphous polymers is a conventional polymer which is well known to those skilled in the art. Dispersant-viscosity improvers (DVI), that is, polymers having polar group containing monomers copolymerized with hydrocarbon monomers or grafted onto hydrocarbon polymer backbones are also contemplated as amorphous polymers. Examples of DVI include, but are not limited to, poly-methacrylate-aminoalkyl substituted acrylic monomer copolymers, styrene-diene copolymers having grafted thereon N-vinyl nitrogen containing monomers, for example, N-vinyl imidazole, hydrocarbon polymers having grafted thereon acrylic monomers such as maleic anhydride, acrylic acid, and other such monomers, which grafted polymers are further reacted with primary and secondary amine, and numerous others.

The Oil of Lubricating Viscosity

The lubricating compositions and methods of this invention employ an oil of lubricating viscosity, including natural or synthetic lubricating oils and mixtures thereof. Mixture of mineral oil and synthetic oils, particularly polyalphaolefin oils and polyester oils, are often used.

Natural oils include animal oils and vegetable oils (e.g. castor oil, lard oil and other vegetable acid esters) as well as mineral lubricating oils such as liquid petroleum oils and solvent-treated or acid treated mineral lubricating oils of the paraffinic, naphthenic or mixed paraffinic-naphthenic types. Hydrotreated or hydrocracked oils are included within the scope of useful oils of lubricating viscosity.

Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.), alkylated diphenyl ethers and alkylated diphenyl sulfides and their derivatives, analogs and homologues thereof and the like.

Alkylene oxide polymers and interpolymers and derivatives thereof, and those where terminal hydroxyl groups have been modified by esterification, etherification, etc., constitute other classes of known synthetic lubricating oils that can be used.

Another suitable class of synthetic lubricating oils that can be used comprises the esters of dicarboxylic acids and those made from $C_5$ to $C_{12}$ monocarboxylic acids and polyols or polyol ethers.

Other synthetic lubricating oils include liquid esters of phosphorus-containing acids, polymeric tetrahydrofurans and the like, silicon-based oils such as the poly-alkyl-, polyaryl-, polyalkoxy-, or polyaryloxy-siloxane oils and silicate oils.

Hydrotreated naphthenic oils are well known.

Unrefined, refined and rerefined oils, either natural or synthetic (as well as mixtures of two or more of any of these) of the type disclosed hereinabove can used in the compositions of the present invention. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin III, U.S. Pat. No. 4,326,972 and European Patent Publication 107,282, both of which are hereby incorporated by reference for relevant disclosures contained therein.

A basic, brief description of lubricant base oils appears in an article by D. V. Brock, "Lubrication Engineering", Volume 43, pages 184-5, March, 1987, which article is expressly incorporated by reference for relevant disclosures contained therein.

Other Additives

The compositions of this invention may contain minor amounts of other components. The use of such additives is optional and the presence thereof in the compositions of this invention will depend on the particular use and level of performance required. The compositions may comprise a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, detergents, dispersants, auxiliary viscosity improvers, oxidation inhibiting agents, metal passivating agents, pour point depressing agents, extreme pressure agents, anti-wear agents, color stabilizers and anti-foam agents.

Extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Auxiliary viscosity improvers (also sometimes referred to as viscosity index improvers) may be included in the compositions of this invention. Viscosity improvers are usually polymers, including polyisobutenes, polymethacrylic acid esters, diene polymers, polyalkyl styrenes, alkenylarene-conjugated diene copolymers and polyolefins. Multifunctional viscosity improvers, which have dispersant and/or antioxidancy properties are known and may optionally be used. Such products are described in numerous publications Pour point depressants are a particularly useful type of additive often included in the lubricating oils described herein. See for example, page 8 of 'Lubricant Additives" by C. V. Smalheer and R. Kennedy Smith (Lezius-Hiles Company Publisher, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures. Examples of pour point depressants are polyacrylates, alkylated naphthalenes, styrene/alkyl maleate and fumarate—and maleate ester/vinyl acetate copolymers.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125-162.

Detergents and dispersants may be of the ash-producing or ashless type. The ash-producing detergents are exemplified by oil soluble neutral and basic salts, wherein "basic salt" is used to designate metal salts wherein the metal is present in stoichiometrically larger amounts than the organic acid radical, of alkali or alkaline earth metals with sulfonic acids, carboxylic acids, phenols or organic phosphorus acids characterized by at least one direct carbon-to-phosphorus linkage.

Basic salts and techniques for preparing and using them are well known to those skilled in the art and need not be discussed in detail here. The extent of overbasing resulting in a basic salt is indicated by the term metal ratio (MR) which indicates the number of equivalents of base per equivalent of acid.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| |
|---|
| 3,163,603 |
| 3,184,474 |
| 3,215,707 |
| 3,219,666 |
| 3,271,310 |
| 3,272,746 |
| 3,281,357 |
| 3,306,908 |
| 3,311,558 |
| 3,316,177 |
| 3,340,281 |
| 3,341,542 |
| 3,346,493 |
| 3,351,552 |
| 3,381,022 |
| 3,399,141 |
| 3,415,750 |
| 3,433,744 |
| 3,444,170 |
| 3,448,048 |
| 3,448,049 |
| 3,451,933 |
| 3,454,607 |
| 3,467,668 |
| 3,501,405 |
| 3,522,179 |
| 3,541,012 |
| 3,541,678 |
| 3,542,680 |
| 3,567,637 |
| 3,574,101 |
| 3,576,743 |
| 3,630,904 |
| 3,632,510 |
| 3,632,511 |
| 3,697,428 |
| 3,725,441 |
| 4,194,886 |
| 4,234,435 |
| 4,491,527 |
| RE 26,433 |

(2) Reaction products of relatively high molecular weight aliphatic or alicyclic halides with amines, preferably polyalkylene polyamines. These may be characterized as "amine dispersants" and examples thereof are described, for example, in the following U.S. patents:

| |
|---|
| 3,275,554 |
| 3,438,757 |
| 3,454,555 |
| 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| |
|---|
| 3,413,347 |
| 3,697,574 |
| 3,725,277 |

-continued 3,725,480
3,726,882

(4) Products obtained by post-treating the carboxylic amine or Mannich dispersants with such reagents are urea, thiourea, carbon disulfide, aldehydes, ketones, carboxylic acids, hydrocarbon-substituted succinic anhydrides, nitrites, epoxides, boron compounds, phosphorus compounds or the like. Exemplary materials of this kind are described in the following U.S. patents:

3,036,003
3,087,936
3,200,107
3,216,936
3,254,025
3,256,185
3,278,550
3,280,234
3,281,428
3,282,955
3,312,619
3,366,569
3,367,943
3,373,111
3,403,102
3,442,808
3,455,831
3,455,832
3,493,520
3,502,677
3,513,093
3,533,945
3,539,633
3,573,010
3,579,450
3,591,598
3,600,372
3,639,242
3,649,229
3,649,659
3,658,836
3,697,574
3,702,757
3,703,536
3,704,308
3,708,522
4,234,435

(5) Interpolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

3,329,658
3,449,250
3,519,565
3,666,730
3,687,849
3,702,300

The above-noted patents are incorporated by reference herein for their disclosures of ashless dispersants.

The above-illustrated additives may each be present in lubricating compositions at a concentration of as little as 0.001% by weight usually ranging from about 0.01% to about 20% by weight, more often from about 1% to about 12% by weight.

Lubricating Oil Compositions

The lubricating oil compositions of this invention contain a major amount of an oil of lubricating viscosity and a minor amount, usually from about 0.1 to about 2% by weight of the mixture of polymers A) and B) on a neat, diluent-free basis, preferably from about 0.5 to about 1.5% by weight. The components making up the mixture of polymers may also be added, individually, to the oil of lubricating viscosity. In this event, the relative amounts of components added individually are in the same ratio that is used in the mixture.

Additive Concentrates

The mixture of this invention may be present as a component of an additive concentrate. Additive concentrates comprise the mixtures of this invention, optionally together with other performance improving additives in concentrated form, usually in the presence of a substantially inert, normally liquid, organic diluent. A wide variety of diluents such as hydrocarbon solvents, oils and the like are useful diluents. More often, the diluent is an oil of lubricating viscosity.

Typically, the mixtures of this invention are present in additive concentrates in amounts ranging from about 1% to about 50% by weight, often to about 20% based on the total weight of the additive concentrate. Not all lubricant manufacturers are capable of handling solid polymers so it is frequently necessary to provide the polymeric mixture in a liquid form that can be handled without specialized equipment. The purpose of supplying the mixture in concentrated form is to reduce the cost of shipping the polymer containing mixture to the end user. The additive concentrate typically contains the maximum amount of active materials (polymer and other performance improving additives) keeping in mind the need to be able to handle, e.g., pump, pour, etc. the concentrate. The consistency of the additive concentrate will depend upon the amount of polymer present therein and can range from liquid to gel to solid. Thus, the amount of polymer contained in the additive concentrate frequently will depend upon the ability of the lubricant blender to handle the concentrate.

Often, the polymer composition and additive concentrates containing same will contain a small amount, typically from about 0.01% to about 1% by weight of an antioxidant such as a hindered phenol, aromatic amine and the like.

The mixture may be prepared in neat, essentially diluent-free form by mixing the diluent-free individual polymer components. Such mixing typically requires specialized equipment, for example equipment that allows the components o be combined by milling, calendering, extrusion and the like are all useful for preparing essentially diluent-free mixtures.

Another means for preparing diluent-free polymer mixtures is to dissolve the polymers, individually or together in a solvent in which each polymeric component is soluble, then to remove the solvent from the polymer containing solution by evaporation, stripping the solvent by heating the solution, frequently under reduced pressure, precipitating the polymeric mixture from the solution by chilling the solution to a temperature at which the polymeric mixture is no longer soluble, or to precipitate the polymeric mixture from the solution by mixing the polymer containing solution with another solvent in which the polymeric mixture is insoluble or has only limited solubility or other techniques well known to those skilled in the art.

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

The following examples demonstrate the principles of this invention.

EXAMPLE 1

In this and the next example, ethylene propylene copolymers containing low and high ethylene, with characteristics shown in Table 1 are prepared using conventional Ziegler Natta catalysts. Polymers L-1 through L-3 are low ethylene polymers (LEP) of various molecular weight with crystallinity below 5%. Polymers H-1 through H-4 are high ethylene polymers (HEP) of various molecular weight with crystallinity greater than 20%.

TABLE 1

| Polymer | Wt-% Ethylene | Density (Kg/m3) | $\overline{M}w$ $\times 10^{-3}$ | $\overline{M}n$ $\times 10^{-3}$ | SSI (%) | Tm (° C.) | Crystallinity (%) |
|---|---|---|---|---|---|---|---|
| L-1 | 50 | 853 | 290 | 150 | 49 | −36 | 0 |
| L-2 | 54 | 853 | 200 | 100 | 37 | −39 | 3 |
| L-3 | 54 | 853 | 130 | 69 | 23 | −39 | 3 |
| H-1 | 75 | 867 | 182 | 98 | 25 | 38 | 21 |
| H-2 | 75 | 868 | 130 | 72 | 18 | 39 | 23 |
| H-3 | 75 | 866 | 100 | 57 | 13 | 36 | 22 |
| H-4 | 75 | 867 | 88 | 47 | 8 | 38 | 22 |

In this example, four concentrates, containing blends of various polymers shown in Table 1 are first made by dissolving them in 150N mineral oil at 120-130° C. Their compositions are shown in Table 2. Concentrate C-1 contains 100% of the 23 SSI LEP (L-3), with $\overline{M}w$ of 130,000 and $\overline{M}n$ of 69,000. Concentrate C-2 is a 50/50(wt) blend of the 23 SSI LEP (L-3) and 25 SSI HEP (H-1). Concentrate C-3 is a 50/50(wt) blend of the 37 SSI LEP (L-2) and 13 SSI HEP (H-3) while Concentrate C-4 is a 50/50(wt) blend of the 37 SSI LEP (L-2) polymer and 8 SSI HEP (H-4).

TABLE 2

| Polymer Concentrates | C-1 | C-2 | C-3 | C-4 |
|---|---|---|---|---|
| Components | | | | |
| Mineral Oil (150 N) | 87.4 | 87.4 | 88.7 | 88.1 |
| L-3 (23 SSI LEP) | 12.5 | 6.25 | | |
| L-2 (37 SSI LEP) | | | 5.6 | 5.9 |
| H-1 (25 SSI HEP) | | 6.25 | | |
| H-3 (13 SSI HEP) | | | 5.6 | |
| H-4 (8 SSI HEP) | | | | 5.9 |
| Antioxidant | 0.1 | 0.1 | 0.1 | 0.1 |
| Total | 100.0 | 100.0 | 100.0 | 100.0 |
| Results | | | | |
| Viscosity @ 100° C. | 1,208 | 1,174 | 1,159 | 1,090 |

The concentrates prepared in Table 2 are used to prepare engine oil blends using mineral oil as well as polyalphaolefin (PAO) and synthetic esters as base oils. Table 3 shows the mineral oil blends, ME-1 through ME-4, containing concentrates C-1 through C-4 respectively. Table 4 shows the corresponding synthetic base oil formulations, SE-1 through SE-4, also containing the concentrates, C-1 through C-4 respectively. The results of evaluation of several low temperature properties of these engine oil blends are shown in Tables 3 and 4.

In rating the "Weissenberg Effect" shown in Table 3 and 4 (and Tables 6 and 7 in the next example), the engine oils are subject to the CCS measurement in a Cannon Automatic Cold-Cranking Simulator (CCS-5, Series II). The Weissenberg Effect is actually assessed during the material transfer cycle between the CCS measurements. During this cycle, the engine oils are injected into the cold chamber in the CCS equipment and subject to high shear mixing to clean the chamber. At the same time, the materials are cooled to the measurement temperatures. The combination of low temperature and high shear triggers the Weissenberg effect with some engine oils. In Tables 3 and 4, the Weissenberg Effect is measured by the extent to which the engine oil climbs up shaft on the spindle and the extent to which gelation and polymer drop-out occur under severe situations. The ratings are as follows: 1=No climbing of shaft; 2=Climbs half way up the shaft; 3=Climbs all the way up the shaft; 4=Climbs all the way up shaft, combined with gelation and some indication of polymer drop-out; 5=Climbs up shaft, with substantial amount of polymer drop-out which wraps around the shaft.

In the low temperature M-11 study, the engine oils are placed in the oil pan in a Cummins M-11 engine that is driven by a motor. The whole engine is kept in a chamber which can be cooled down to −30° C. The engine is initially motored for 1 hour until the bulk oil temperature is at or above 80° C. The chamber is then cooled down from room temperature to −5° C. at the rate of 10° C. per hour. The engine oil is then further cooled to −20° C. at the rate of 3° C. per hour. The motor is then started and the pressure at various points, including the oil pump outlet, the inlet and outlet to the oil filter, the front galley, and the Turbo and Rocker shaft, are measured. In these studies, focus is placed on the filter pressure build-up between the inlet and outlet of the oil filter (Delta P) during the initial part of the cycle.

Figure 1:
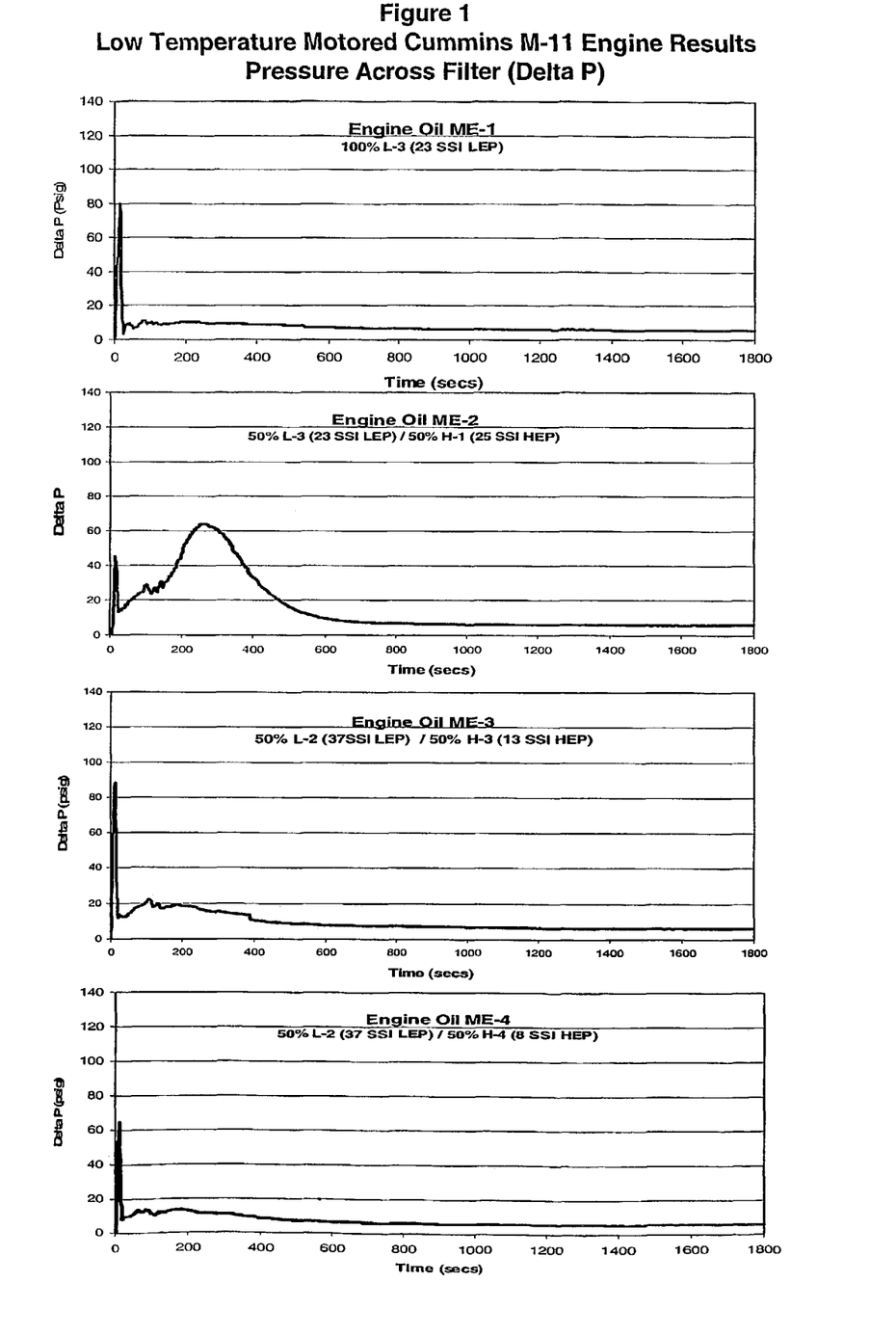

FIG. 1 shows some typical results of Delta P versus time for the engine oils, ME-1 through ME-4 shown in Table 3. In all the graphs in FIG. 1, there is an initial spike which occurs in the first 10 to 20 seconds. This represents the pressure difference that occurs as the engine oil moves into the filter and can generally be ignored. As the engine oil passes through the filter, a pressure build-up occurs with some engine oils, such as ME-2. This pressure build-up has been correlated to the plugging of the filter due to formation of gels in the engine oil at low temperature. The pressure build-up begins to subside, generally around 100 to 200 seconds of the cycle because the engine oil begins to warm up and finally melts away the gels. In Table 3 (and Table 6, in the next example) the peak pressure due to this pressure build-up are measured for each of the engine oils.

Finally, the cold storage stability results shown in Tables 3 and 4 (Tables 6 and 7 in the next example) are obtained by placing tubes of the engine oils in refrigerators set at 0° C. and −18° C. for 4 weeks. The engine oils are examined every week for signs of gel formation which would lead to uneven or lumpy flow when the tubes containing the engine oils are tilted. Results designated as "Fluid" in these Tables mean that the engine oils do not show any sign of gels during the 4 weeks of storage in the cold temperatures.

As can be seen from Table 3, all four polymer concentrates yield engine oils (ME-1 through M-4) with about the same SSI, in the range of 24 to 27. However, engine oils containing a blend of the LEP and HEP (ME-2 through ME-4) have significantly better (i.e. lower) CCS and MRV-TP1 than ME-1, which contains only the low ethylene polymer. Furthermore, it can be seen that, of the engine oils which contain blends of LEP and HEP, the blend with 23 SSI LEP and 25 SSI HEP (ME-2), have considerably worse low temperature properties in terms of Weissenberg effect and M-11 filter pressure build-up compared to blends containing the lower SSI HEPs, namely, ME-3 (with the 13 SSI HEP), and ME-4 (with the 8 SSI HEP). This example illustrates that, in order to obtain good low temperature properties for engine oils, it is necessary to use a blend of LEP and HEP, with the HEP having a low molecular weight, with SSI of 13 or less.

TABLE 3

| Ingredients | ME-1 | ME-2 | ME-3 | ME-4 |
|---|---|---|---|---|
| Formulations | | | | |
| Mineral Oil, 150 N | 73.4 | 73.7 | 73.1 | 73.1 |
| Mineral Oil, 600 N | 5.5 | 5.5 | 5.5 | 5.5 |
| Additives | 11.0 | 11.0 | 11.0 | 11.0 |
| Pour Point Depressant | 0.5 | 0.5 | 0.5 | 0.5 |
| Concentrate C-1 | 9.6 | | | |
| Concentrate C-2 | | 9.3 | | |
| Concentrate C-3 | | | 9.9 | |
| Concentrate C-4 | | | | 9.9 |
| Total | 100.0 | 100.0 | 100.0 | 100.0 |
| Results | | | | |
| Viscosity @ 100° C. | 14.6 | 15.1 | 14.6 | 14.5 |
| CCS @ −20° C. | 3,870 | 3,540 | 3,520 | 3,570 |
| MRV-TP1 @ −30° C. | 32,800 | 24,500 | 27,500 | 28,500 |
| SSI | 24 | 26 | 27 | 27 |
| Storage, 4 weeks @ 0° C. | Fluid | Fluid | Fluid | Fluid |
| Storage, 4 weeks @ −18° C. | Fluid | Fluid | Fluid | Fluid |
| Weissenberg Effect | 1 | 3 | 1 | 1 |
| Low Temp M-11 Delta P | 10 | 65 | 22 | 15 |

Table 4 shows a similar trend with the synthetic base oils. Engine oils containing a blend of the LEP and HEP (SE-2 through SE-4) have lower CCS and MRV-TP1 than SE-1 (which contains only the LEP, L-3), although the benefit is not as significant as the differences shown for the mineral oil blends in Table 3. However, in terms of Weissenberg effect and cold storage stability, the synthetic oil blend containing the higher (25) SSI HEP (SE-2) shows a dramatically worse result than those blends (SE-3 and SE-4) containing the lower SSI HEP. Again, this example shows the advantage of using the lower molecular weight (lower SSI) HEPs in these kinds of blends to obtain the best combination low temperature properties (CCS and MRV-TP1), storage stability and low temperature M-11 performance.

TABLE 4

| Formulations: | SE-1 | SE-2 | SE-3 | SE-4 |
|---|---|---|---|---|
| Ingredients: | | | | |
| PAO, 4 cst | 37.0 | 37.2 | 36.7 | 36.7 |
| PAO, 6 cst | 19.9 | 20.0 | 19.8 | 19.8 |
| Synthetic Ester | 15.0 | 15.0 | 15.0 | 15.0 |
| Additives | 17.3 | 17.3 | 17.3 | 17.3 |
| Concentrate C-1 | 10.9 | | | |
| Concentrate C-2 | | 10.5 | | |
| Concentrate C-3 | | | 11.2 | |
| Concentrate C-4 | | | | 11.2 |
| Total | 100.0 | 100.0 | 100.0 | 100.0 |
| Results | | | | |
| Viscosity @ 100° C. | 14.0 | 14.0 | 14.2 | 14.1 |
| CCS @ −20° C. | 3,300 | 2,940 | 3,170 | 3,280 |
| MRV-TPI @ −30° C. | 29,900 | 20,800 | 28,400 | 26,100 |
| SSI | 23 | 25 | 28 | 26 |
| Storage, 4 weeks @ 0° C. | Fluid | Gels | Fluid | Fluid |
| Storage, 4 weeks @ −18° C. | Fluid | Gels | Fluid | Fluid |
| Weissenberg Effect | 1 | 4 | 1 | 1 |

EXAMPLE 2

In this example, four additional concentrates, C-5 through C-8, with compositions shown in Table 5, are prepared. Concentrate C-5 contains 100% of the 37 SSI LEP (L-2), with Mw of 200,000 and Mn of 100,000. Concentrate C-6 is a 50/50(wt) blend of 49 SSI LEP (L-1) and 18 SSI HEP (H-2). Concentrate C-7 is a 50/50(wt) blend of 49 SSI LEP (L-1) and 13 SSI HEP (H-3) while Concentrate C-8 is a 50/50(wt) blend of 49 SSI LEP (L-1) polymer and 8 SSI HEP (H-4).

The concentrates in Table 5 are used to prepare engine oil blends with mineral oil as well as PAO and synthetic ester base oils. Table 6 shows the mineral oil blends, ME-5 through ME-8, containing concentrates C-5 through C-8 respectively. Table 7 shows the corresponding synthetic base oil formulations, SE-5 through SE-8, also containing the concentrates, C-5 through C-8 respectively. The results of evaluation of several low temperature properties of these engine oil blends are also shown in Tables 6 and 7.

TABLE 5

| Polymer Concentrates | C-5 | C-6 | C-7 | C-8 |
|---|---|---|---|---|
| Ingredients | | | | |
| Mineral Oil (150 N) | 91.1 | 91.1 | 90.1 | 89.7 |
| L-2 (37 SSI LEP) | 9.5 | | | |
| L-1 (49 SSI LEP) | | 4.4 | 4.9 | 5.1 |
| H-2 (18 SSI HEP) | | 4.4 | | |
| H-3 (13 SSI HEP) | | | 4.9 | |
| H-4 (8 SSI HEP) | | | | 5.1 |
| Antioxidant | 0.1 | 0.1 | 0.1 | 0.1 |
| Total | 100.7 | 100.0 | 100.0 | 100.0 |
| Results | | | | |
| Viscosity @ 100° C. | 1,185 | 1,009 | 1,176 | 1,094 |

TABLE 6

| Formulations: | ME-5 | ME-6 | ME-7 | ME-8 |
|---|---|---|---|---|
| Ingredients: | | | | |
| Mineral Oil, 150 N | 72.9 | 73.1 | 73.4 | 73.5 |
| Mineral Oil, 600 N | 5.5 | 5.5 | 5.5 | 5.5 |
| Additives | 11.0 | 11.0 | 11.0 | 11.0 |
| Pour Point Depressant | 0.5 | 0.5 | 0.5 | 0.5 |
| Concentrate C-1 | 10.1 | | | |
| Concentrate C-2 | | 9.9 | | |
| Concentrate C-3 | | | 9.6 | |
| Concentrate C-4 | | | | 9.5 |
| Total | 100.0 | 100.0 | 100.0 | 100.0 |
| Results | | | | |
| Viscosity @ 100° C. | 14.56 | 13.8 | 14.35 | 14.04 |
| SSI | 36 | 40 | 39 | 40 |
| CCS @ −20° C. | 3,400 | 3,100 | 3,170 | 3,200 |
| MRV-TP1 @ −30° C. | 31,800 | 27,200 | 30,900 | 29,500 |

TABLE 6-continued

| Formulations: | ME-5 | ME-6 | ME-7 | ME-8 |
|---|---|---|---|---|
| Storage, 4 weeks @ 0° C. | Fluid | Fluid | Fluid | Fluid |
| Storage, 4 weeks @ −18° C. | Fluid | Fluid | Fluid | Fluid |
| Weissenberg Effect | 1 | 3 | 1 | 1 |
| Low Temp M-11 Delta P | 10 | 72 | 21 | 16 |

Table 6 shows that all four polymer concentrates in Table 5 yield engine oils (ME-5 through ME-8) with about the same SSI, in the range of 36 to 40. However, engine oils containing a blend of the HEP and LEP (ME-6 through ME-8) have significantly lower CCS and MRV-TP1 than ME-5, which contains only the LEP. Again, it can be seen that, of the engine oil containing blends of LEP and HEP, the one which contains the 49 SSI LEP and 18 SSI LEP (ME-6), has considerably worse Weissenberg effect and M-11 filter pressure build-up compared to blends containing the lower SSI HEP, ME-7 (with the 13 SSI HEP), and ME-8 (with the 8 SSI HEP). This example again demonstrates the benefit of incorporating HEP with low molecular weight (with SSI of 13 or less) to impart good low temperature properties to the engine oils.

A similar trend is shown in Table 7 with the synthetic base oils. Again, in terms of Weissenberg effect and low temperature storage stability, the synthetic oil blend containing the higher 18 SSI HEP (SE-6) shows a dramatically worse result than those blends, SE-7 and SE-8, containing the lower SSI (13 and 8) HEPs. This example again demonstrates the advantage of using low molecular weight (low SSI) HEPs in these kinds of blends to obtain the best combination low temperature properties (CCS and MRV-TP1), storage stability and low temperature M-11 performance.

TABLE 7

| Formulations | SE-5 | SE-6 | SE-7 | SE-8 |
|---|---|---|---|---|
| Ingredients | | | | |
| PAO, 4 cst | 36.5 | 36.7 | 36.9 | 37.0 |
| PAO, 6 cst | 19.7 | 19.8 | 19.9 | 19.9 |
| Synthetic Ester | 15.0 | 15.0 | 15.0 | 15.0 |
| Additives | 17.3 | 17.3 | 17.3 | 17.3 |
| Concentrate C-5 | 11.5 | | | |
| Concentrate C-6 | | 11.2 | | |
| Concentrate C-7 | | | 10.9 | |
| Concentrate C-8 | | | | 10.8 |
| Total | 100.0 | 100.0 | 100.0 | 100.0 |
| Results | | | | |
| Viscosity @ 100° C. | 14.0 | 13.7 | 13.6 | 13.5 |
| CCS @ −20° C. | 3,050 | 2,930 | 2,900 | 2,940 |
| MRV-TP1 @ −30° C. | 30,400 | 28,400 | 27,400 | 27,300 |
| SSI | 32 | 35 | 38 | 36 |
| Storage, 4 weeks @ 0° C. | Fluid | Gels | Fluid | Fluid |
| Storage, 4 weeks @ −18° C. | Fluid | Gels | Fluid | Fluid |
| Weissenberg Effect | 1 | 4 | 1 | 1 |

Each of the documents referred to above is incorporated herein by reference. Except in the examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A mixture comprising
    A) a copolymer comprising from about 60 to about 85% by weight of units derived from ethylene, and having
        (a) $\overline{M}_w$ measured by gel permeation chromatography employing polystyrene standard ranging from 70,000 up to 110,000 and (f) SSI≦18;
        (b) density (D) ranging from about 845 to about 895 kg/m$^3$;
        (c) $\overline{M}_w/\overline{M}_n$ less than 3;
        (d) melting point ($T_m$) measured by differential scanning calorimeter ranging from about 15° C. to about 60° C.; and
        (e) degree of crystallinity≧15%; and
    B) an amorphous polymer of one or more olefins selected from the group consisting of ethylene-propylene copolymers and ethylene-propylene-diene copolymers, having 45% to 55% by weight units derived from ethylene, having $\overline{M}_w$ ranging from 130,000 to 400,000 and having degree of crystallinity≦5%.

2. The mixture of claim 1 wherein the percentage content (E: % by weight) of repeating units derived from ethylene and melting point ($T_m$: ° C.) of the copolymer A) fulfill the expression $$3.44E - 206 \geq T_m.$$

3. The mixture of claim 1 wherein the density and the melting point fulfill the expression $$T_m \leq 1.247D - 1037.$$

4. The mixture if claim 1 wherein copolymer A) comprises from about 70 to about 79% by weight of units derived from ethylene, and has
    (a) $\overline{M}_w$ measured by gel permeation chromatography employing polystyrene standard ranging from about 70,000 up to 110,000;
    (b) density (D) ranging from about 857 to about 882 kg/m$^3$;
    (c) $\overline{M}_w/\overline{M}_n$ about 1.5 to about 2.2;
    (d) melting point ($T_m$) measured by differential scanning calorimeter ranging from about 15° C. to about 60° C.; and
    (e) degree of crystallinity from about 20% to about 30%.

5. The mixture of claim 1 comprising from about 20 to about 80 parts by weight (A) and from about 80 to about 20 parts by weight (B).

6. The mixture of claim 1 wherein the copolymer (A) is an ethylene-α-olefin copolymer.

7. The mixture of claim 6 wherein the copolymer A) comprises units derived from ethylene and propylene.

8. The mixture of claim 7 wherein the copolymer A) further comprises units derived from polyenes.

9. The mixture of claim 8 wherein the polyenes are dienes.

10. The mixture of claim 8 wherein the copolymer A) comprises from about 0.5 to about 10 parts by weight of units derived from polyene.

11. The mixture of claim 1 wherein the copolymer A) has a degree of crystallinity ranging from about 15% to about 50%.

12. The mixture of claim 1 wherein the polymer A) comprises a dispersant-viscosity improver.

13. The mixture of claim 1 wherein the amorphous polymer B) has a degree of crystallinity ranging from about 0 to about 5%.

14. The mixture of claim 1 wherein the amorphous polymer B) comprises a dispersant-viscosity improver.

15. A lubricating oil composition comprising a major amount of an oil of lubricating viscosity and minor amounts of
A) a copolymer comprising from about 60 to about 85% by weight of units derived from ethylene, and having
  (a) $\overline{M}_w$ measured by gel permeation chromatography employing polystyrene standard ranging from about 70,000 up to 110,000 and (f) $SSI \leq 18$;
  (b) density (D) ranging from about 845 to about 895 kg/m$^3$;
  (c) $\overline{M}_w/\overline{M}_n$ less than 3;
  (d) melting point ($T_m$) measured by differential scanning calorimeter ranging from about 15° C. to about 60° C.; and
  (e) degree of crystallinity $\geq 15\%$, and
B) an amorphous polymer of one or more olefins selected from the group consisting of ethylene-propylene copolymers and ethylene-propylene-diene copolymers, having 45% to 55% by weight units derived from ethylene, having $\overline{M}_w$ ranging from 130,000 to 400,000 and having degree of crystallinity $\leq 5\%$.

16. The lubricating oil composition of claim 15 wherein the density and the melting point of copolymer A) fulfill the expression $T_m \leq 1.247 D - 1037$.

17. The lubricating oil composition of claim 15 wherein the percentage content (E: % by weight) of repeating units derived from ethylene and melting point ($T_m$: ° C.) of the copolymer A) fulfill the expression $$3.44E - 206 \geq T_m.$$

18. The lubricating oil composition of claim 15 wherein A) and B) are incorporated individually into the oil of lubricating viscosity.

19. The lubricating oil composition of claim 15 comprising from about 0.3 to about 15 parts by weight of the copolymer A) and from about 0.3 to about 15 parts by weight of the amorphous polymer B).

20. An additive concentrate comprising from about 1% to about 50% by weight of the mixture of claim 1 and the balance being a hydrocarbon solvent or an oil of lubricating viscosity.

21. A process for preparing the mixture of claim 1 comprising solubilizing copolymer A) in an oil of lubricating viscosity followed by adding and solubilizing the amorphous polymer B).

22. A process for preparing the mixture of claim 1 comprising combining polymers A) and B) in an extruder.

23. A process for preparing the mixture of claim 1 wherein the $\overline{M}_w$ of copolymer A) is 80,000 to 110,000 and the $\overline{M}_w$ of copolymer B) is 130,000 to 290,000.

* * * * *